United States Patent [19]

Klobucar et al.

[11] Patent Number: 5,304,524

[45] Date of Patent: Apr. 19, 1994

[54] ASYMMETRIC HYDROGENATION OF AROMATIC-SUBSTITUTED OLEFINS USING ORGANORUTHENIUM CATALYST

[75] Inventors: W. Dirk Klobucar; Charles H. Kolich; Thanikavelu Manimaran; Tse-Chong Wu, all of Baton Rouge, La.

[73] Assignee: Ethyl Corporation, Richmond, Va.

[21] Appl. No.: 958,525

[22] Filed: Oct. 8, 1992

Related U.S. Application Data

[63] Continuation of Ser. No. 716,006, Jun. 17, 1991, abandoned.

[51] Int. Cl.$^5$ .............................................. B01J 31/00
[52] U.S. Cl. ..................................... 502/167; 502/162
[58] Field of Search ........................ 502/161, 162, 167

[56] References Cited

U.S. PATENT DOCUMENTS 4,440,936 4/1984 Riley ................................... 562/496

OTHER PUBLICATIONS

Kobayashi, et al. Chem. Letters (1988) p. 1137.
Alcock, et al. Tetrahedron Asymmetry 2(1) p. 47 (1991).

*Primary Examiner*—Joseé G. Dees
*Assistant Examiner*—Joseph M. Conrad, III
*Attorney, Agent, or Firm*—Richard J. Hammond

[57] ABSTRACT

A process for the asymmetric reduction of carboxylic acids of the formula

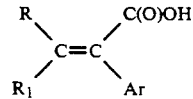

or the amine salts thereof, where R and $R_1$ are the same or different and are hydrogen, alkyl, cycloalkyl or haloalkyl and Ar is aryl or substituted aryl is disclosed.

5 Claims, No Drawings

ASYMMETRIC HYDROGENATION OF AROMATIC-SUBSTITUTED OLEFINS USING ORGANORUTHENIUM CATALYST

This is a continuation of copending application Ser. No. 07/716,006 filed on Jun. 17, 1991 now abandoned.

FIELD OF THE INVENTION

This invention relates to a process for the catalytic reduction of aromatic-substituted olefins. More specifically, this invention relates to a process for asymmetrically, catalytically reducing aromatic-substituted olefins using a mixture of an organo ruthenium compound and an optically active organo-phosphorous compound.

BACKGROUND OF THE INVENTION

Enantioselective catalysis using chiral metal complexes provides one of the most general and flexible methods for achieving asymmetric organic reactions. Metallic elements possess a variety of catalytic activities, and permutations of organic ligands or other auxiliary groups directing the steric course of the reaction are practically unlimited. Efficient ligands must be endowed with, for example, suitable functionality, appropriate chirality, a structure capable of differentiating space either electronically or sterically and skeletal rigidity or flexibility.

Among the asymmetric organic reactions catalyzed by chiral transition metal complexes, asymmetric hydrogenation has been one of the best studied, due in large part to the fact that it is the basis for the first commercialized catalytic asymmetric process. See, for example, ApSimon, et al., *Tetrahedron*, 1986, 42, 5157.

Some of the more interesting of the asymmetric hydrogenation catalysts are those derived from BINAP 2,2'-bis(diphenylphosphino)-1,1'-binaphthyl]. See, for example, U.S. Pat. Nos.: 4,691,037; 4,739,084; 4,739,085; 4,764,629; 4,994,607; and 4,766,227. Unlike the more classical models of chiral (asymmetric) molecules, chirality in the case of the BINAP-type compounds arises from the restricted rotation about the single bond joining the naphthalene rings. Isomers arising from this type of asymmetry are termed atropisomers.

BINAP-based Ru(II) and Rh(I) complexes induce high enantioselectivity in catalytic reactions. See Noyori and Takaya, *Acc. Chem. Res.*, 1990, 23, 345.

The BINAP ruthenium complexes are dramatically different from the rhodium ones. They have been used to catalyze a variety of asymmetric hydrogenations, including the hydrogenation of enamides and alkyl and aryl-substituted acrylic acids. See Noyori, et al., *Modern Synthetic Methods*, 1989, 5, 115, incorporated herein by reference. Unlike the rhodium catalyzed reductions, ruthenium(II) carboxylate complexes possessing the BINAP ligand are efficient catalysts for the enantioselective hydrogenation of α, β-unsaturated carboxylic acids. According to Ohta, et al, *J. Org. Chem*, 52, 3174 (1982), the carboxyl moiety of the substrate, and not other oxygen containing groups, is responsible for the stereoselective reaction. Asymmetric reductions of noncarboxyl-containing substrates by ruthenium complexes are inefficient.

The preparation of the BINAP-bearing ruthenium complexes, while not only sophisticated, is time consuming and expensive. Accordingly, it would be advantageous to be able to carry out these enantioselective transformations using more readily prepared catalysts.

In rhodium catalyzed asymmetric reactions, in situ methods of preparing the active catalysts are well established. However, such an in situ method to prepare ruthenium catalysts is not generally successful. See, for example, B. Heiser, et al., *Tetrahedron Asymmetry*, 2, 51 (1991). The necessity of synthesizing the catalyst in an extra step and complications due to catalyst instability are avoided by in situ catalyst generation.

SUMMARY OF THE INVENTION

The present invention involves a novel method for the use of organoruthenium compounds which, when admixed in an appropriate solvent with ligands having optical activity, can be used as in situ catalyst to effect the asymmetric reduction of certain unsaturated organic compounds.

DESCRIPTION OF THE PREFERRED EMBODIMENTS

In the present specification, alkyl means straight or branched chain alkyl having 1 to 20 carbon atoms and includes, for example, methyl, ethyl, propyl, isopropyl, butyl, isobutyl, secondary butyl, tertiary butyl, pentyl, isopentyl, neopentyl, hexyl, heptyl, octyl, 2-ethylhexyl, 1,1,3,3-tetramethylbutyl, nonyl, decyl, dodecyl, tetradecyl, hexadecyl, octadecyl, and eicosyl.

Cycloalkyl mean cyclic alkyl having 3 to 7 carbon atoms and includes cyclopropyl, cyclobutyl, cyclopentyl, cyclohexyl and cycloheptyl.

Substituted aryl means phenyl or naphthyl substituted by at least one substituent selected from the group consisting of halogen (chlorine, bromine, fluorine or iodine), amino, nitro, hydroxy, alkyl, alkoxy, which means straight or branched chain alkoxy having 1 to 10 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptyloxy, octyloxy, nonyloxy and decyloxy, haloalkyl which means straight or alkyl having 1 to 8 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-difluorobutyl, trichloromethyl, trifluoromethyl, 2,2,2-trifluoroethyl, 2,3,3-trifluoropropyl, 1,1,2,2-tetrafluoroethyl and 2,2,3,3-tetrafluoropropyl.

Haloalkyl means straight or branched chain alkyl having 1 to 10 carbon atoms which is substituted by at least one halogen as mentioned above.

Phenylalkyl means that the alkyl moiety is straight or branched chain alkyl having 1 to 8 carbon atoms and includes, for example, benzyl, 2-phenylethyl, 1-phenylethyl, 3-phenylpropyl, 4-phenylbutyl, 5-phenylpentyl, 6-phenylhexyl and 8-phenyloctyl.

Substituted phenylalkyl means above-mentioned phenylalkyl which is substituted by at least one substituent selected from the group consisting of halogen, amino, nitro, hydroxy, alkyl, alkoxy and haloalkyl on the phenyl nucleus.

Chiral phosphine compound means an optically active alkyl or aryl substituted trivalent phosphorus compound. Examples of such compounds are:

1,2-ethanediyl-bis(o-methoxyphenyl)phenylphosphine (DIPAMP);

N,N'-bis(α-methylbenzyl)-N,N'-bis(diphenylphosphine) ethylenediamine (PNNP);

2,3-bis(diphenylphosphino)butane (CHIRAPHOS);

1,2-bis(diphenylphosphino)propane (PROPHOS);

2,3-O-isopropylidene-2,3-dihydroxy-1,4-bis(diphenyl-phosphino)butane (DIOP);

2,4-t-butyl 4-(diphenylphosphino)-2-(diphenylphosphino-methyl)-1-pyrrolidine-carboxylate (BPPM);

2,4-bis(diphenylphosphino)pentane (SKEWPHOS);

2,5-bis(diphenylphosphino)hexane (BDPH);

1,2-bis(diphenylphosphino)-1-phenylethane (PHENPHOS);

1,2-bis(diphenylphosphino)-1-cyclohexylethane (CYCPHOS);

α-[1,2-bis(diphenylphosphino)ferrocenyl]-ethyl-dimethyl-amine (BPPFA); and trans-4,5-bis[(5H-dibenzophospholyl)methyl]-2,2-dimethyl-1,3-dioxolane (DIPHOL).

A detailed description of suitable phosphines for the present invention is disclosed in "*Asymmetric Synthesis*", Vol. 5, Ed. by James D. Morrison, Academic Press, Orlando (1985), incorporated herein by reference.

The enantioselective preparations of the present invention are carried out optionally using amine salts of α-aryl olefinic carboxylic acids. When amine salts are used, they are derived from a wide variety of primary, secondary or tertiary hydrocarbyl amines. They include the aromatic amines, aliphatic amines, mixed aromatic/aliphatic amines, as well as heterocyclic and cycloaliphatic amines. Such hydrocarbyl amino compounds are illustrated by methylbenzylamine, ethyldiisopropylamine, N-methylpiperidine, triethylamine, pyrrole, etc. They react readily with the carboxylic acid function of the α-aryl olefinic carboxylic acid to produce amine salts, usually by preparing a solution of equimolar amounts of the two reactants. The resulting amine salts, generated in situ or preformed, are used in the subsequent step of the process of this invention.

The carboxylic acids have the formula

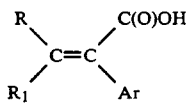

where R and $R_1$ are the same or different and are hydrogen, alkyl, cycloalkyl, or haloalkyl and Ar is aryl or substituted aryl. Preferably R and $R_1$ are the same or different and are hydrogen or alkyl. The amine salts are also useful in the process of the present invention. Most preferred in the above carboxylic acid is where R and $R_1$ are the same and are hydrogen or methyl. They are reduced (hydrogenated) asymmetrically by a catalytic process employing a mixture of (i) a ruthenium compound and (ii) an optically active ligand such as BINAP in an appropriate solvent where the ligand is

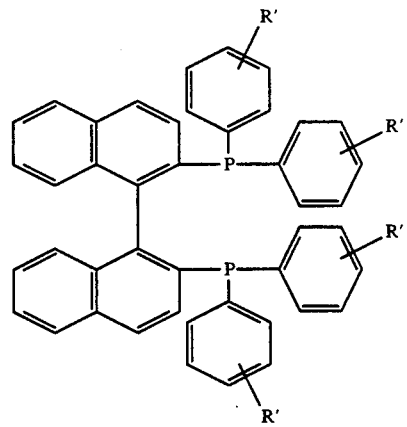

where R' is hydrogen (BINAP), alkyl, haloalkyl, aryl or substituted aryl. It is neither necessary nor economically desirable to isolate the chiral metal catalyst that may be formed in this mixture prior to hydrogenation of the substrate.

The ruthenium compounds of use in this invention may be any of a wide variety of compounds and include, for example, the halides such as ruthenium(III) bromide or ruthenium(III) chloride, mixed halide-chelate complexes such as (cycloocta-1,5-diene)ruthenium(II) chloride polymer, i.e., the chelate complex salts such as illustrated by $[Ru(COD)Cl_2]_n$, or (cycloocta-1,5-diene)ruthenium(II) (2,4-pentanedionate) or ruthenium(III) (2,4-pentanedionate). The hydrates of the above compounds can also be used. Interestingly, the present invention works well when starting with either Ru(II) or Ru(III) complexes whereas prior art is only effective with Ru(II) species.

The preferred ruthenium compounds of use in the process of the present invention are the chelate complexes of the formula

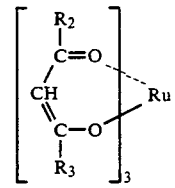

where $R_2$ and $R_3$ are the same or different and are alkyl, aryl, haloalkyl, phenylalkyl or substituted phenylalkyl.

In the preferred ruthenium compound, it is most preferred that $R_2$ and $R_3$ are the same and are alkyl of 1 to 12 carbon atoms having a linear or branched chain. Particularly preferred are where $R_2$ and $R_3$ are the same and are linear or branched $C_1$ to $C_6$ alkyl group. Illustrative alkyl groups most preferably employed as $R_2$ and $R_3$ are methyl, ethyl, propyl, isopropyl, butyl, isobutyl, secondary butyl, tertiary butyl, pentyl, isopentyl, neopentyl, trifluoromethyl and the like.

The chiral organophosphorous compound admixed with the ruthenium compound is preferably one where all R' are the same and are hydrogen or $C_1$ to $C_6$ linear or branched alkyl. Most preferably all R' are the same and are hydrogen, methyl, ethyl, propyl or isopropyl.

The asymmetric catalytic hydrogenations utilizing the catalyst mixture of (i) and (ii) above is mixed with a solution of an α-aryl olefinic carboxylic acid or its amine salt, typically in a molar ratio of (i):(ii) of 10:1 to 1:10, preferably 8:1 to 1:8, most preferably 1:1.

The molar ratio of (i) to the olefinic acid or its amine salt is between about 1 to 20 to about 1 to 20,000, preferably about 1 to 100 to about 1 to 10,000, most preferably about 1 to 5,000 to about 1 to 10,000.

The combination of the catalyst mixture, the olefinic carboxylic acid (or the amine salt of such acid) and suitable organic solvent, provide a system suitable for hydrogenation at elevated hydrogen pressure, i.e., pressures above about 75 psig.

To achieve enantioselective hydrogenation of a free α-olefinic carboxylic acid, a mixture of (i) and (ii) in the hydrogenation solvent must be given time (typically 1 to 5 hours) to become activated, either with or without hydrogen pressure at room temperature or at elevated temperature, before the substrate is introduced.

The chemical reactions described above are generally disclosed in terms of their broadest application to the preparation of the compounds of this invention. Occasionally, the reactions may not be applicable as described to each compound included within the disclosed scope. The compounds for which this occurs will be readily recognized by those skilled in the art. In all such cases, either the reactions can be successfully performed by conventional modifications known to those skilled in the art, e.g., by appropriate protection of interfering groups, by changing to alternative conventional reagents, by routine modification of reaction conditions, and the like, or other reactions disclosed herein or otherwise conventional, will be applicable to the preparation of the corresponding compounds of this invention. In all preparative methods, all starting materials are known or readily prepared from known starting materials.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

General

All solvents used in the hydrogenation were reagent grade and were sparged with nitrogen for at least 2 hours to remove oxygen. The S-BINAP, R-BINAP, R,R-DIOP, S,S-DIOP, ruthenium(III) (2,4-pentanedionate), ruthenium(III) chloride, and (1,5-cyclooctadiene)ruthenium(II) chloride polymer used were commercially available materials. Conversions were determined by GC (area %). Optical purities were determined by HPLC using a chiral column. The hydrogenation reactors were constructed of Hastelloy C, Monel 400 or 316 Stainless Steel.

Preparation of (S-BINAP)Ruthenium(II) Diacetate

The material was made by the method of T. Ohta, H. Takaya and R. Noyori, *Inorg. Chem.*, 1988, 27, 566.

Preparation of (1,5-Cyclooctadiene)ruthenium(II) (2,4-Pentanedionate)

This compound was prepared from (1,5-cyclooctadiene)-ruthenium(II) chloride polymer in 79–84% yield by the procedure of Powell, P., *J. Organomet. Chem.*, 1974, 65, 89.

EXAMPLE 1

A 1.05 mmole portion of 2-(4-isobutylphenyl)acrylic acid (UA) was combined with 0.050 mmoles of ruthenium(III) (2,4-pentanedionate) and 30 ml of methanol in a 50-ml Hastelloy C pressure reactor. The reactor was flushed with hydrogen ($3 \times 300$ psi) and then sealed with 1000 psi hydrogen. After stirring the mixture at 300 rpm for 21 hr at 24° C., a GC analysis of the red solution showed a product composition of 8% ibuprofen and 92% UA. The mixture was then stirred (300 rpm) at 100° C. for 8 hr with 1000 psi $H_2$ to obtain complete conversion of the UA to ibuprofen. HPLC analysis showed the ibuprofen was racemic (0% ee).

EXAMPLE 2

Example 1 was repeated using the S-methylbenzylamine (S-MBA) salt of UA in place of UA. The hydrogenation was complete after stirring (300 rpm) the mixture at 24° C. for 18 hr with 1000 psi $H_2$. HPLC analysis showed the ibuprofen amine salt was racemic.

EXAMPLE 3

A 0.055 mmole portion of Ru(acac): was combined with 0.061 mmole of (S)-(−)-2,2′bis(diphenylphosphino)-1,1′-binaphthyl (S-BINAP), 1.54 mmole of UA·S-MBA, and 30 ml of methanol in a 100-ml Monel pressure reactor in a nitrogen-filled glove box. The reactor was flushed ($3 \times 300$ psi $H_2$) and then stirred (300 rpm) with 1000 psi hydrogen at 24° C. After 22 hr, a GC analysis showed the hydrogenation was complete. HPLC analysis indicated the optical purity of the S-ibuprofen amine salt wa 91% (95.3% S enantiomer).

EXAMPLE 4

Example 3 was repeated using UA·R-MBA in place of UA·S-MBA and R-BINAP in place of S-BINAP. The hydrogenation was complete (GC) after stirring (300 rpm) for 17 hr at 24° C. with 1000 psi $H_2$. HPLC analysis showed the optical purity of the R-ibuprofen amine salt was 85% (92.5% R enantiomer).

EXAMPLE 5

Example 3 was repeated using UA·R-MBA in place of UA·S-MBA. After stirring (300 rpm) for 17 hr at 24° C. with 1000 psi hydrogen, the hydrogenation was only 34% complete by GC analysis. After continuing the reaction for a total of 41 hr, the conversion reached 94%. The reaction was stopped, and the optical purity of the S-ibuprofen amine salt was found to be 88% by HPLC.

EXAMPLE 6

Example 3 was repeated using R-BINAP in place of S-BINAP. As found in Example 5, the hydrogenation was slower than that observed for Example 3. After stirring (300 rpm) for 22 hr at 24° C./1000 psi $H_2$, conversion was 44%. The hydrogenation was complete after 53 hr at 24° C./1000 psi $H_2$/300 rpm. The optical purity of the R-ibuprofen amine salt was 89% by HPLC.

EXAMPLE 7

Example 3 was repeated using the benzylamine salt of UA in place of UA·S-MBA. The reaction was 94% complete after stirring (300 rpm) for 18 hr at 22° C. with 1000 psi H$_2$. The optical purity of the S-ibuprofen amine salt was 85% by HPLC.

EXAMPLE 8

Example 3 was repeated using the triethylamine salt of UA in place of UA·S-MBA. Results were very similar to those obtained for Example 3 in that the hydrogenation was complete in 18 hr at 24° C./1000 psi H$_2$/300 rpm with an S-ibuprofen amine salt optical purity of 88% by HPLC.

EXAMPLE 9

Example 3 was repeated using (1,5-cyclooctadiene)-ruthenium(II) (2,4-pentanedionate) in place of Ru(acac)$_3$. Similar results were obtained with the reaction complete in 18.5 hr at 24° C./1000 psi H$_2$/300 rpm and the S-ibuprofen amine salt having an optical purity of 89% by HPLC.

EXAMPLE 10

Example 3 was repeated using RuCl$_3$·$\chi$H$_2$O in place of RU(acac)$_3$. The hydrogenation was complete in 22.5 hr at 24° C./1000 psi H$_2$/300 rpm. The optical purity of the S-ibuprofen amine salt showed a reduction to 64% by HPLC.

EXAMPLE 11

Example 8 was repeated using (1,5-cyclooctadiene)-ruthenium(II) chloride polymer in place of Ru(acac)$_3$. Similar results were obtained with reaction complete in 18 hr at 24° C./1000 psi H$_2$/300 rpm and the optical purity of the S-ibuprofen amine salt being 85% by HPLC.

EXAMPLE 12

Example 3 was repeated except that 50% of the methanol solvent (15 ml) was replaced with cyclohexane. The hydrogenation was slower, requiring 33.5 hr at 24° C./1000 psi H$_2$/300 rpm to reach completion, but the optical purity of the S-ibuprofen amine salt was still high (89% by HPLC).

EXAMPLE 13

Example 3 was repeated using UA in place of UA·S-MBA. The hydrogenation was complete in 18 hr at 24° C./1000 psi H$_2$/300 rpm, but the optical purity of the S-ibuprofen was very low (6% by HPLC).

EXAMPLE 14

Example 13 was repeated except that 0.54 mmole of triethylamine (0.44 equivalent based on UA) was included in the reaction mixture. The hydrogenation was complete after 20 hr at 24° C./1000 psi H$_2$/300 rpm with a slight improvement observed for the optical purity of the S-ibuprofen (11% by HPLC).

EXAMPLE 15

Example 14 was repeated using 0.52 mmole of trioctylamine (0.43 equivalent based on UA) in place of the triethylamine. Hydrogenation of UA was complete in 16.5 hr at 24° C./1000 psi H$_2$/300 rpm. Optical purity of the S-ibuprofen by HPLC was 25%.

EXAMPLE 16

Example 15 was repeated using a slight molar excess of trioctylamine (1.48 mmole) to UA (1.46 mmole). Hydrogenation was carried out at 24° C./1000 psi H$_2$/300 rpm. The first sample of the reaction mixture taken after 65 hr and analyzed by GC showed the reaction was complete. The optical purity of the S-ibuprofen amine salt was 91% by HPLC.

EXAMPLE 17

To improve the enantioselectivity for hydrogenation of UA that was observed in Example 13 without adding an amine (as was done in Examples 14, 15, and 16) the introduction of substrate was delayed until the catalyst components had sufficient time to form the active asymmetric catalyst. A 0.045 mmole portion of Ru(acac)$_3$ was combined with 0.042 mmole of S-BINAP and 30 ml methanol in a 100-ml Monel pressure reactor in a nitrogen-filled glove box. The reactor was flushed (3×300 psi H$_2$) and then stirred (300 rpm) at 25° C. for 4 hr with 1000 psi H$_2$. The reactor was vented and a solution of 1.22 mmole of UA in 10 ml methanol was added to the reactor in the glove box. The reactor was flushed (3×300 psi H$_2$) and stirred (300 rpm) at 23° C./1000 psi H$_2$. After 17 hr, UA conversion to S-ibuprofen was 100%, and the optical purity of the product was 88% by HPLC.

EXAMPLE 18

Example 17 was repeated using UA·Et$_3$N in place of UA. Results were identical to Example 17. Hydrogenation was complete in 17 hr at 23° C./1000 psi H$_2$/300 rpm and the S-ibuprofen amine salt optical purity was 88% by HPLC.

EXAMPLE 19

Example 17 was repeated except the hydrogenation temperature was reduced to −2° C. and 50-ml Hastelloy C pressure reactor was used. The reaction required 88 hr to reach completion and the optical purity of the S-ibuprofen was only 18% by HPLC.

EXAMPLE 20

Example 17 was repeated except that the Ru(acac)$_3$ and S-BINAP were allowed to react at 60° C. for 3 hr instead of at 25° C. with 1000 psi H$_2$ and stirring at 300 rpm. This change resulted in a more active catalyst that gave complete hydrogenation of UA in 1.5 hr at 24° C./1000 psi H$_2$/300 rpm. The optical purity of the S-ibuprofen decreased somewhat to 81% by HPLC.

EXAMPLE 21

Example 20 was repeated except that the Ru(acac)$_3$ and S-BINAP were allowed to react at 100° C. for 3 hr with 1000 psi H$_2$ and stirring at 300 rpm. Again, hydrogenation of UA was rapid 1.75 hrs/room temperature/1000 psi H$_2$/300 rpm), but the optical purity of the S-ibuprofen showed another decrease (73% by HPLC).

EXAMPLE 22

Example 17 was repeated in a 316 stainless steel reactor using (+)-2,3-O-isopropylidene-2,3-hydroxy-1,4-bis(diphenylphosphino)butane (S,S-DIOP) in place of S-BINAP. Hydrogenation of UA was complete in 69 hr at 20° C./1000 psi H$_2$/300 rpm. The optical purity of the S-ibuprofen by HPLC was 22%.

EXAMPLE 23

Example 13 was repeated using R,R-DIOP in place of S-BINAP. Hydrogenation of UA was 62% complete after 16 hr at room temperature/1000 psi H$_2$/300 rpm.

The optical purity of the R-ibuprofen was 30% by HPLC.

EXAMPLE 24

Example 17 was repeated using (2R,5R)-bis(diphenyl-phosphino)hexane (R,R-BDPH) in place of S-BINAP. Hydrogenation of UA was complete in 3 hr at 65° C./1000 psi H$_2$/300 rpm. The S-ibuprofen produced had an optical purity of 18% by HPLC.

COMPARATIVE EXAMPLES 25-30

These examples were all carried out by combining the preformed catalyst Ru(S-BINAP)(OAc)$_2$ and the substrate with 30 ml of methanol in a 100-ml Monel pressure reactor in a nitrogen-filled glove box. The reactor was flushed with hydrogen (3×300 psi) and then stirred at 24-28° C. with 950-1000 psi H$_2$ (Example 29 used 250 psi H$_2$ ) for 5-18 hr. The S-ibuprofen or S-ibuprofen amine salts were obtained with optical purities ranging from 86-92% by HPLC.

Results of the above examples are summarized in the following table.

TABLE I

HYDROGENATION RESULTS
(900-100 psi H$_2$ in Methanol)

| EXAMPLE | SUBSTRATE (mmoles) | CATALYST STOICHIOMETRY (mmoles) METAL COMPLEX | PHOSPINE COMPOUND | AMINE (mmoles) | H$_2$ RUN TEMP/ TIME (°C./hr) | CONV.$^a$ (GC AREA %) | % ee |
|---|---|---|---|---|---|---|---|
| 1 | UA (1.05) | Ru(acac)$_3$ (0.050) | None | None | 24/21 100/8 | 8 100 | 0 |
| 2 | UA.S-MBA (0.80) | Ru(acac)$_3$ (0.078) | None | None | 24/18 | 100 | 0 |
| 3 | UA.S-MBA (1.54) | Ru(acac)$_3$ (0.055) | S-BINAP (0.061) | None | 24/22 | 100 | 91 (S) |
| 4 | UA.R-MBA (1.27) | Ru(acac)$_3$ (0.045) | R-BINAP (0.048) | None | 24/17 | 100 | 85 (R) |
| 5 | UA.R-MBA (1.25) | Ru(acac)$_3$ (0.038) | S-BINAP (0.048) | None | 24/17 24/41 | 34 94 | 88 (S) |
| 6 | UA.S-MBA (1.61) | Ru(acac)$_3$ (0.055) | R-BINAP (0.067) | None | 24/22 24/53 | 44 100 | 89 (R) |
| 7 | UA.BZA (1.29) | Ru(acac)$_3$ (0.038) | S-BINAP (0.045) | None | 22/18 | 94 | 85 (S) |
| 8 | UA.Et$_3$N (1.29) | Ru(acac)$_3$ (0.040) | S-BINAP (0.042) | None | 24/18 | 100 | 88 (S) |
| 9 | UA.S-MBA (1.40) | Ru(COD)(acac)$_2$ (0.039) | S-BINAP (0.040) | None | 24/18.5 | 100 | 89 (S) |
| 10 | UA.S-MBA (1.59) | RuCl$_3$.xH$_2$O (0.048) | S-BINAP (0.053) | None | 24/16 24/22.5 | 93 100 | 64 (S) |
| 11 | UA.Et$_3$N (1.28) | [Ru(COD)Cl$_2$]$_n$ (0.054) | S-BINAP (0.048) | None | 24/18 | 100 | 85 (S) |
| 12$^b$ | UA.S-MBA (1.24) | Ru(acac)$_3$ (0.038) | S-BINAP (0.043) | None | 24/9.5 24/33.5 | 32 100 | 89 (S) |
| 13 | UA (1.23) | Ru(acac)$_3$ (0.043) | S-BINAP (0.047) | None | 24/18 | 100 | 6 (S) |
| 14 | UA (1.23) | Ru(acac)$_3$ (0.040) | S-BINAP (0.043) | Et$_3$N (0.54) | 24/18 24/20 | 95 100 | 11 (S) |
| 15 | UA (1.22) | Ru(acac)$_3$ (0.043) | S-BINAP (0.045) | Oct$_3$N (0.52) | 24/16.5 | 100 | 25 (S) |
| 16 | UA (1.46) | Ru(acac)$_3$ (0.045) | S-BINAP (0.060) | Oct$_3$N (1.48) | 24/65 | 100 | 91 (S) |
| 17 | UA (1.22) | Ru(acac)$_3$ (0.045) | S-BINAP (0.042) | None | 23/17 | 100 | 88 (S) |
| 18 | UA.Et$_3$N (1.29) | Ru(acac)$_3$ (0.040) | S-BINAP (0.050) | None | 23/17 | 100 | 88 (S) |
| 19$^c$ | UA (1.17) | Ru(acac)$_3$ (0.053) | S-BINAP (0.049) | None | −2/17 −2/88 | 68 100 | 18 (S) |
| 20 | UA (1.59) | Ru(acac)$_3$ (0.050) | S-BINAP (0.051) | None | 24/1.0 24/1.5 | 95 100 | 81 (S) |
| 21 | UA (1.82) | Ru(acac)$_3$ (0.060) | S-BINAP (0.066) | None | RT/1.75 RT/18 | 100 100 | 73 (S) |
| 22 | UA (1.25) | Ru(acac)$_3$ (0.040) | S,S-DIOP (0.044) | None | 20/69 | 100 | 22 (S) |
| 23 | UA (1.03) | Ru(acac)$_3$ (0.050) | R,R-DIOP (0.072) | None | RT/16 | 62 | 30 (R) |
| 24 | UA (1.35) | Ru(acac)$_3$ (0.045) | R,R-BDPH (0.057) | None | 65/3 | 100 | 18 (S) |
| 25 | UA.S-MBA (0.75) | Ru(S-BINAP) (OAc)$_2$ (0.02) | None | None | 24/10 | 100 | 89 (S) |
| 26 | UA.S-MBA (1.26) | Ru(S-BINAP) (OAc)$_2$ (0.043) | None | None | 24/5 | 100 | 89 (S) |
| 27 | UA.R-MBA (1.29) | Ru(S-BINAP) (OAc)$_2$ (0.045) | None | None | 24/5 | 100 | 90 (S) |
| 28 | UA (1.00) | Ru(S-BINAP) (OAc)$_2$) (0.02) | None | None | 28/7 | 100 | 90 (S) |
| 29$^d$ | UA (1.00) | Ru(S-BINAP) (OAc)$_2$ (0.02) | None | None | 24/18 | 100 | 86 (S) |
| 30 | UA (1.00) | Ru(S-BINAP) (OAc)$_2$) | None | None | 24/16 | 100 | 92 (S) |

TABLE I-continued

HYDROGENATION RESULTS
(900–100 psi $H_2$ in Methanol)

| EXAMPLE | SUBSTRATE (mmoles) | CATALYST STOICHIOMETRY (mmoles) | | AMINE (mmoles) | $H_2$ RUN TEMP/ TIME (°C./hr) | CONV.[a] (GC AREA %) | % ee |
|---|---|---|---|---|---|---|---|
| | | METAL COMPLEX | PHOSPINE COMPOUND | | | | |
| | | (0.02) | | | | | |

[a]Conversion of substrate to ibuprofen or its amine salt.
[b]Cyclohexane/methanol solvent (1:1).
[c]Between 17 and 24 hours, the $H_2$ pressure fell to 500 psi before it was returned to 1000 psi.
[d]Hydrogenation was done at 250 psi ($H_2$).
RT = room temperature
ee = enantiomeric excess (optical purity)
acac = 2,4-pentanedionate
BDPH = 2,5-bis(diphenylphosphino)hexane
BINAP = 2,2'-bis(diphenylphosphino)-1,1'-binaphthyl
BZA = benzylamine
COD = 1,5-cyclooctadiene
DIOP = 2,3-O-isopropylidene-2,3-dihydroxy-1,4-bis(diphenylphosphino)butane
MBA = α-methylbenzylamine
UA = 2-(4-isobutylphenyl)acrylic acid

We claim:

1. An asymmetric hydrogenation catalyst composition comprising of mixture of (i) chiral phosphine compound, (ii) ruthenium compound of the formula

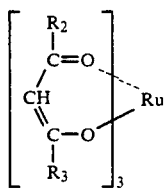

and (iii) optionally an organic amine and optionally hydrogen, wherein the chiral phosphine is BINAP and R2 and R3 are the same and are methyl.

2. The composition according to claim 1 wherein said chiral phosphine compound if BINAP.

3. The composition according to claim 1 wherein $R_2$ and $R_3$ are the same and are alkyl of 1 to 12 carbon atoms having a linear or branched chain.

4. The composition according to claim 3 wherein $R_2$ and $R_3$ are the same and are linear or branched $C_1$ to $C_6$ alkyl.

5. The composition according to claim 2 comprising an organic amine.

* * * * *